J. J. MARTIN.
TRACTOR.
APPLICATION FILED DEC. 19, 1919.

1,379,464.

Patented May 24, 1921.

INVENTOR
John J. Martin
BY
James J. Sheehy & Co.
ATTORNEYS.

UNITED STATES PATENT OFFICE.

JOHN J. MARTIN, OF DALLAS, TEXAS.

TRACTOR.

1,379,464.     Specification of Letters Patent.     Patented May 24, 1921.

Application filed December 19, 1919. Serial No. 345,954.

*To all whom it may concern:*

Be it known that I, JOHN J. MARTIN, a citizen of the United States, residing at Dallas, in the county of Dallas and State of Texas, have invented new and useful Improvements in Tractors, of which the following is a specification.

My present invention pertains to tractors and the like and it contemplates the provision in a tractor of a drum or wheels in which the power plant of the tractor is placed so that the dead weight of the power plant is reduced and turned into live weight and thereby tends to assist in operating the drum or wheels of the tractor over the ground.

The invention in all of its details will be fully understood when considered in connection with the drawings accompanying and forming part of this specification, in which.

Similar reference numerals are employed to designate corresponding parts in all of the views of the drawings.

Figure 1:
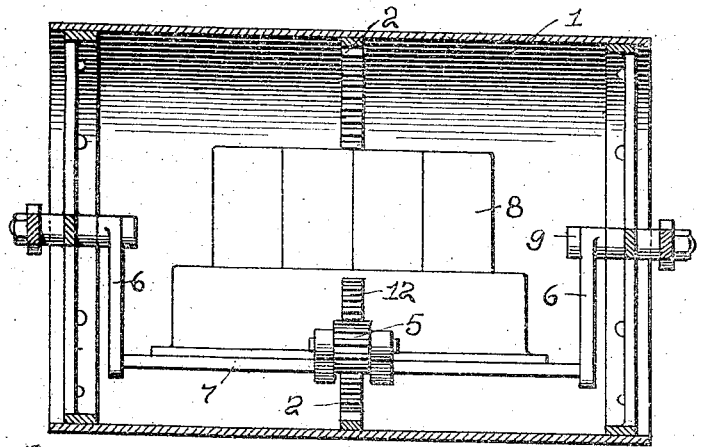
Figure 1, is a longitudinal central section of the drum and power plant support arranged therein.

As illustrated by the drawings, I provide the drum 1 having the internal gear 2 that extends completely around the internal bore of the drum. At this point, I would distinctly have it understood that I do not wish to be confined to the use of a drum as in the future practice of the invention wheels may be employed in lieu of the drum. The said drum 1 is provided with the cross-supports 3 and said supports carry the shaft 4. This shaft 4 is employed to keep the pinions 5 in constant mesh with the internal gear 2 of the drum or wheel. The supports 3 act as braces for the drum 1 and gear 2 as well as a support for the shaft 4; said shaft acting as a bearing on which the drum 1 revolves.

Figure 2:
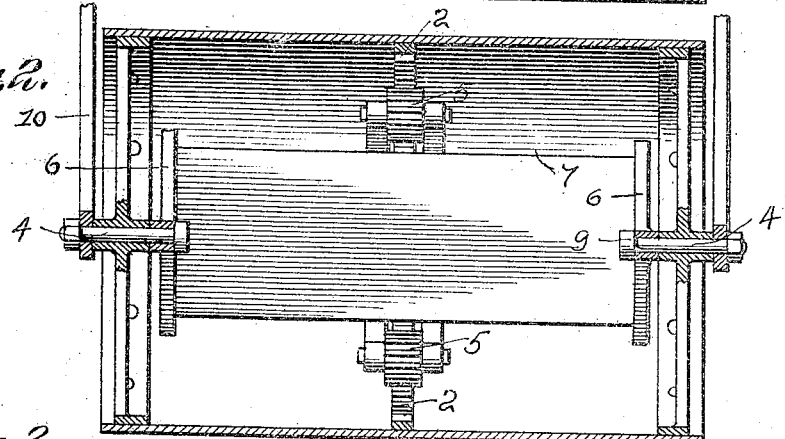
Fig. 2, is a top plan view of the same.
Figure 3:
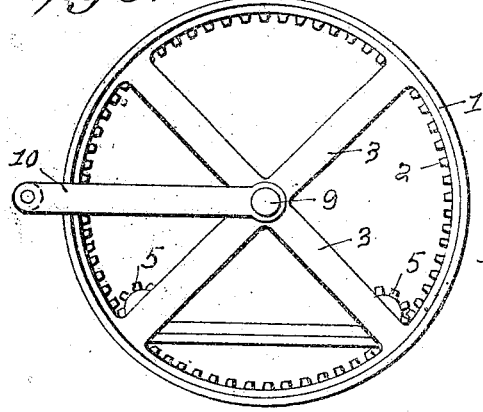
Fig. 3, is a side elevation of the drum or wheel of my invention.
Figure 4:
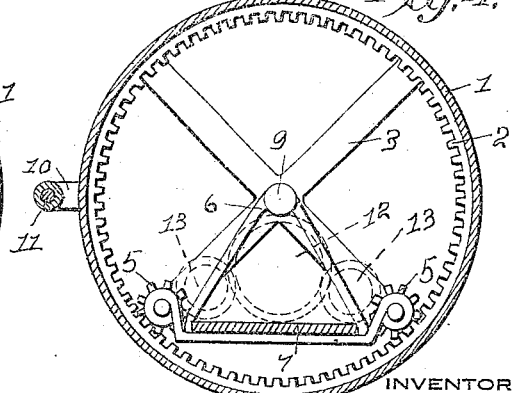
Fig. 4 is a section of the drum of my device.

By reference to Fig. 2 it will be apparent that I provide a frame rod 6 that surrounds the shaft 4 and assists the shaft 4 in keeping the pinions 5 in mesh with the gear 2 and secured to the rod 6 is a platform 7 on which rests the power plant 8 (Fig. 1). Surrounding the shaft 4 is a hollow shaft 9 and mounted on and extending from said shaft 9 is an arm or rod 10. The said shafts 4 and 9 are duplicated at both ends of the drum 1 as is also the rod 10 and in the practical use of my invention a draw bar 11 extends from one to the other of the bars 10. It will be appreciated that the rods 10 keep a constant position with respect to the carrying rods and hence when the frame advances around the gear 2 the rods 10 move forward and exert pull on the draw bar.

It is apparent that the power plant causes the gear 12 to rotate and hence motion is imparted to the gears 13 and hence to pinions 5 and hence the power-plant and frame in attempting to climb the internal gear 2 will by its own weight tend to assist its power in rotating the drum 1 and the tractor in moving forward.

It will be gathered from the foregoing that the power does not operate directly to revolve the drum 1 but to cause the power plant and frame to climb the inner circumference of the drum and hence produce a downward pull on the rim of the drum and bring about a forward and backward movement of the drum over the ground. Also the draw bar pull is added to the weight of the power plant, frame and support and said draw bar pull is on the frame and not on the axle of the tractor member and because of the free movement of the carrying-frame, an element of elasticity is produced in the pulling force of the tractor that eliminates wear and tear because of the fact that a sudden stop will not cause a sudden stop of the power plant.

It will be seen that a slight interval of rest is assured the drum while the plant exerts its entire force in getting the draw bar load over heavy pulls.

I would distinctly have it understood that the contacting points between the frame and inside of the drum will vary according to the slope of the ground and pull on the draw bar.

In addition to the foregoing, I consider my device to be greatly advantageous over similar devices, in that a low center of gravity is present which produces a tractor that is impossible to upset on any slope or surface of land and because of the lack of dead weight, a small amount of resistance to the tractor will be encountered.

I do not wish to be understood as confining myself to the exact construction and relative arrangement of parts, as in the future practice of the invention such changes or modifications may be made as fairly fall within the scope of my appended claims.

Having described my invention, what I claim and desire to secure by Letters-Patent is:—

1. In a tractor, the combination of a cylinder, cross-bars formed on the cylinder, shafts secured to the bars, a frame suspended in the cylinder by the shafts, a power plant mounted on the frame, pinions arranged on the frame, a gear extending around the interior of the cylinder and adapted to mesh with the pinions, gears arranged adjacent the frame and adapted to be driven by the power plant and adapted also to mesh with the pinions to impart motion thereto and a bar journaled on the shaft.

2. In a tractor, the combination of a cylinder, cross-bars formed integral on the ends of the cylinder, shafts bearing on the cross-bars, a frame suspended within the cylinder by means of the shafts and adapted to hold a power plant, pinions secured to the sides of the frame, a large internal gear arranged in the center and extending completely around the cylinder and adapted to mesh with the teeth of the pinions, gears arranged on the frame and adapted to be driven by the power plant and also engaging the pinions to impart rotary motion thereto and a draw bar journaled on the shafts whereby when the pinions are driven and impart motion through the internal gear to the cylinder, the frame and draw bar will maintain an even balance with respect to the cylinder.

In testimony whereof I have hereunto set my hand in presence of two subscribing witnesses.

JOHN J. MARTIN.

Witnesses:
D. B. EADES,
F. C. O'BRIEN.